(12) United States Patent
Kelly et al.

(10) Patent No.: US 7,397,542 B2
(45) Date of Patent: Jul. 8, 2008

(54) DETERMINING MODE SPECTRA FOR PRINCIPAL STATES OF POLARIZATION

(75) Inventors: Michael Kelly, Leonberg (DE); Kazuo Yamaguchi, Holzgerlingen (DE); Gunnar Stolze, Althengstett (DE)

(73) Assignee: Agilent Technologies Inc., Santa Clara, CA (US)

( * ) Notice: Subject to any disclaimer, the term of this patent is extended or adjusted under 35 U.S.C. 154(b) by 1081 days.

(21) Appl. No.: 10/649,211

(22) Filed: Aug. 27, 2003

(65) Prior Publication Data
US 2007/0242270 A1    Oct. 18, 2007

(30) Foreign Application Priority Data
Oct. 11, 2002    (EP)    ................................. 02022742

(51) Int. Cl.
*G01N 21/00*    (2006.01)
(52) U.S. Cl. ..................................... 356/73.1
(58) Field of Classification Search ........................ None
See application file for complete search history.

(56) References Cited
U.S. PATENT DOCUMENTS
5,298,972 A * 3/1994 Heffner ....................... 356/364

5,633,959 A * 5/1997 Niki et al. ..................... 385/11
6,229,606 B1    5/2001 Way et al. .................... 356/364

FOREIGN PATENT DOCUMENTS
EP    1113250 A1    7/2001

OTHER PUBLICATIONS
"PDL Measurements Using The Agilent 8169A Polarization Controller", Agilent Test and Measurement Support, 2002, retrieved from the Internet.

* cited by examiner

*Primary Examiner*—Tu T Nguyen (57) ABSTRACT

For determining mode spectra of an optical property of a device under test (DUT) in dependence on a spectral parameter, with the mode spectra corresponding to the device's principal states of polarization (PSPs), minimum and maximum envelope values are determined for the optical property, or other measured values from which the envelope values can be determined with respect to possible state of polarization of light that is incident upon the DUT, whereby the minimum envelope values and the maximum envelope values are determined for a spectral range of interest of the spectral parameter. The mode spectra are derived for the optical property for at least one of the PSPs as a function of the spectral parameter for the spectral range of interest, whereby a partial correspondence of the mode spectra with the minimum and maximum envelope values is used for deriving the mode spectra.

26 Claims, 9 Drawing Sheets

DETERMINING MODE SPECTRA FOR PRINCIPAL STATES OF POLARIZATION

BACKGROUND OF THE INVENTION

The present invention relates to the determination of an optical property of a device under test in dependence on a spectral parameter for specific polarization states of the incident light which are known as the "principal states of polarization" (PSPs). The invention concerns devices that are used or tested by applying light to the device. The optical property can characterize light that then emerges from the device or characterize another response of the device to the input light, such as an output electrical signal.

In the product note "PDL Measurements using the Agilent 8169A Polarization Controller" by Christian Hentschel and Siegmar Schmidt, it is described how the minimum and maximum insertion loss as well as the polarization dependent loss (PDL) can be obtained by means of the scrambling technique, and by means of the Mueller method that is based on a determination of the Mueller matrix of the device under test (DUT). The document "PDL Measurements using the Agilent 8169A Polarization Controller" is herewith incorporated into the description of the present application.

SUMMARY OF THE INVENTION

It is an object of the invention to determine the mode spectra of an optical property for the principal states of polarization (PSPs).

The object is solved by the independent claims. Preferred embodiments are shown by the dependent claims.

According to the invention, mode spectra of an optical property for the principal states of polarization of the device under test are determined in dependence on a spectral parameter. The method comprises a first step of determining minimum and maximum envelope values of said optical property with respect to possible polarization states of the light incident on the DUT. The minimum and maximum envelope values serve as a starting point for deriving the mode spectra of said optical property for at least one of the PSPs of the DUT. According to the invention, the partial correspondence of the PSP mode spectra with the minimum and maximum envelope values is used for deriving said mode spectra.

There exist various techniques for determining minimum and maximum envelope values of an optical property of a device under test. One of said techniques is to vary the input state of polarization over a range of different polarization states ("scrambling"), other techniques are based on the transfer matrix of the DUT. Any other technique for determining minimum and maximum envelope values is suitable as well.

Features in the first mode spectrum for the first principal state of polarization may be spectrally shifted with respect to the second mode curve for the second principal state of polarization or one mode spectrum may exhibit features not present in the other. Then the PSP mode which coincides with the maximum envelope for some values of the spectral parameter can instead coincide with the minimum envelope for other spectral parameter values.

Preferably, said spectral parameter may be the wavelength or the frequency of light incident on the DUT. Other possibilities for the spectral parameter, as intended in the scope of this invention, include but are not limited to input signal power, electrical current or electrical voltage applied to the DUT, temperature, and pressure.

According to a preferred embodiment of the invention, the mode spectra for the principal states of polarization are used for deriving the polarization dependent wavelength shift. As soon as the spectra for the PSPs are known, the polarization dependent wavelength shift can be determined from the shift of said spectra. The polarization dependent wavelength shift indicates how polarization effects affect the behavior of an optical component. The polarization dependent wavelength shift is related to the birefringence of the optical component, which for example may be caused by stress occurring during the manufacturing process, or which may be provided on purpose.

Preferably, the DUT is a planar lightwave circuit (PLC). In this case, the mode spectra obtained for the PSPs of the device under test are the TM (Transverse Magnetic) mode curve and the TE (Transverse Electric) mode curve.

According to a first embodiment of the invention, the minimum and the maximum envelopes are analyzed at spectral points where they are substantially tangent to each other. According to the model underlying the present invention, a partial correspondence of the maximum/minimum envelope values and the mode spectra for the PSPs is assumed. According to this model, the points where the minimum and the maximum envelope touch each other may at the same time be the crossing points of the mode curves for the PSPs. For this reason, these points can e.g. be found by comparing the difference of the minimum and maximum envelope of the optical property with a predefined threshold, whereby said threshold represents the measurement uncertainty. If, for a certain value of the spectral parameter, said difference falls below the threshold, then a crossing point of the PSP mode curves at this value of the spectral parameter is assumed.

In the vicinity of a crossing point, there might exist a range of said spectral parameter where the minimum envelope is very close to the maximum envelope. Instead of identifying one crossing point within this range, an applied algorithm might identify several crossing points. Preferably, in order to assure that only one crossing point is identified, a search window having a certain predefined width is swept over the spectral range of interest. Within said search window, at most one crossing point may be allowed to be assigned. Thus, it is made sure that the crossing points are identified correctly. Said predefined width may be tested or based for example on the polarization dependent wavelength shift determined by the algorithm and if necessary be modified in a second iteration of the algorithm. The same problem might occur in a broader range of the spectral parameter around the peaks of the minimum and maximum envelopes. Also here, it is advantageous to define a spectral band around these peaks and to accept only one crossing point within said spectral band.

Preferably, the range of interest of the spectral parameter is segmented into a set of subsections in accordance with the crossing points, in a way that a respective subsection is delimited by two consecutive crossing points. This implies that between said two consecutive crossing points, no further crossing points exist. Therefore, a segment of the minimum or maximum envelope corresponding to a certain subsection coincides, as a whole, either with the mode spectrum of the first PSP or that of the second PSP.

Preferably, the assignment of said segments of the minimum and maximum envelopes to the mode curves is carried out as follows: within a first subsection, the maximum envelope is assigned to a first mode spectrum and the minimum envelope to a second mode spectrum. For the adjacent subsection, the assignment of the spectra is swapped, because there is a crossing point between the first subsection and the adjacent subsection: In this adjacent subsection, the maximum envelope is assigned to said second mode spectrum and the minimum envelope to said first mode spectrum. Preferably, in an initial step, at a chosen value of the spectral parameter the maximum envelope is assigned to a first mode curve and the minimum envelope is assigned to a second mode curve. Then, the crossing points are identified either in ascending or descending spectral order. Each time a crossing point is identified, for a range of the spectral parameter starting at the identified crossing point, the assignment of the maximum/minimum envelopes to the first and second mode spectra is swapped. By repeatedly swapping the tailings of the maximum and minimum envelopes, the first and second mode curves for the PSPs are generated. This method is very efficient, because the identification of the crossing points and the construction of the mode spectra is done in one pass.

According to a second preferred embodiment of the invention, the mode curves of said optical property for the PSPs are determined from the transfer matrix of the DUT, based on determining the polarization parameters for the PSPs from this matrix at one or more chosen spectral points of reference. At the PSPs, there is only a weak spectral dependence of the polarization parameters, e.g. the Stokes vector components. Therefore, the polarization parameters can be treated as constants within some spectral range around the points of reference. This means that the spectral dependence of the mode curves for the PSPs is generated by the well-known spectral dependence of transfer matrix elements.

Preferably, the one or more points of reference are chosen such that at these points, the difference of the minimum and maximum envelopes is not too small. The polarization parameters of the two principal states of polarization will then be determined most accurately. Another prerequisite is that the one or more points of reference are chosen such that at said points, the value of said optical property corresponds to an optical signal in the measurement that is sufficiently large. Otherwise, the impact of noise could degrade the results.

It is clear that the invention can be partly or entirely embodied or supported by one or more suitable software programs, which can be stored on or otherwise provided by any kind of computer readable medium, for example: a floppy disc, CD rom or magnetic tape and which might be executed in or by any suitable data processing system.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1A:
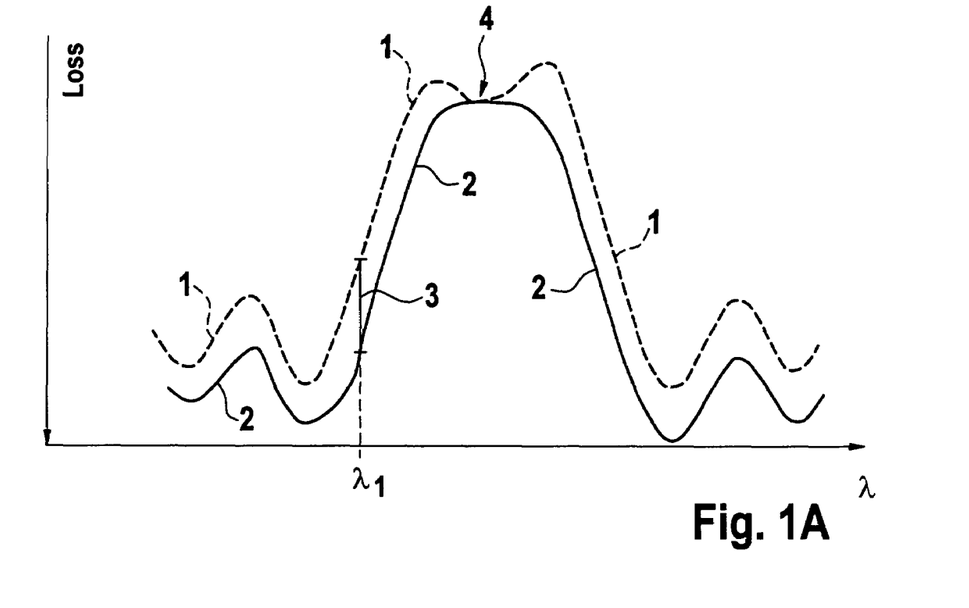
FIG. 1A-C show schematically how the minimum and maximum loss curves of a device under test correspond to the loss curves of the device's principal states of polarization.

When measuring the insertion loss (IL) of a DUT, in most cases, a dependence of the insertion loss on the incident light's state of polarization is encountered. In FIG. 1A, the minimum loss 1 and the maximum loss 2 of a DUT, depending on the input polarization state, are shown as a function of the wavelength of the incident light for a device under test. The DUT could, for example, be an optical filter used to pass only a selected wavelength range. The minimum loss 1 and the maximum loss 2 define the envelopes of the insertion loss. This means for any polarization state, the insertion loss exhibited by the device will occur within the limits defined by the minimum loss 1 and the maximum loss 2. For a certain wavelength $\lambda_1$, the polarization dependent loss (PDL) is defined as the difference 3 between the maximum loss 2 and the minimum loss 1 at the wavelength $\lambda_1$, expressed in dB. Per definition, the minimum and maximum loss curves never intersect. However, at some points, for example at point 4, the minimum loss 1 and the maximum loss 2 may be tangent to each other.

At any chosen wavelength, the maximum and the minimum loss occur at the PSP and every other state of polarization is a mixture of the PSP and thus corresponds to a loss value between those of the PSP. The polarization dependent transmission characteristics of a device under test (DUT) is not only expressed in polarization dependent loss (PDL), but also often in an apparent wavelength shift of the transmission properties. The maximum wavelength shift is observed between the two principal states of polarization of the device under test. Here, as in the product note, "PDL Measurements using the Agilent 8169A Polarization Controller", the two principal states of polarization are referred to as the J-state and the K-state to distinguish them.

Many components for fiberoptic networks are produced by defining optical waveguides, or paths for the light, in films or layers that are deposited on a flat substrate. Such components are sometimes referred to as planar lightwave circuits (PLC). The light passes along the waveguide, which lies in the plane parallel to the substrate. When this light is linearly polarized such that the electric field is perpendicular to this plane, the polarization state is usually referred to as transverse electric (TE) and when the light is polarized such that the electric field is parallel to the plane the polarization state is called transverse magnetic (TM). These TE and TM polarization states are particularly important cases for the PSPs for which it is often desired to obtain the mode spectra.

Figure 1B:
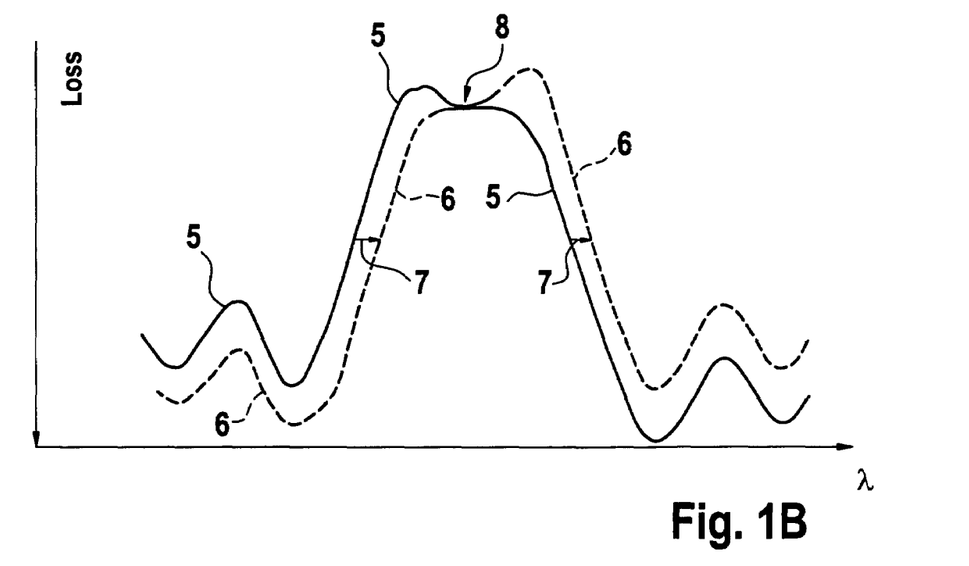

In FIG. 1B, the TE and TM loss curves 5, 6 for a spectral filter based on a PLC are shown as a function of wavelength. It can be seen that the TE and TM loss curves 5, 6 are translated relative to each other along the wavelength axis. The distance between both curves in horizontal direction is usually denoted as the polarization dependent wavelength shift 7. The wavelength shift of a spectral filter curve related to polarization is a key parameter for characterising such components, such as for example arrayed waveguide gratings (AWG), because the wavelength shift affects the overall performance of the filter. Despite recent advances in the PLC and AWG technology in term of polarization independent components, for the majority of component manufacturers the determination of the polarization dependent wavelength shift is still a key parameter. Obviously, a shift in wavelength of the filter response affects higher order parameters of the filter, like bandwidth, ripple, cross talk, centre wavelength etc. The knowledge of the magnitude of the polarization dependent wavelength shift is also used as an indication of the quality of the PLC manufacturing processes. The wavelength shift is directly related to the birefringence of waveguides. In turn, the birefringence depends on the stress profiles along the waveguides induced by the waveguide core and cladding.

In contrast to the minimum and maximum loss curves, for example the minimum loss 1 and the maximum loss 2 shown in FIG. 1A, the TE and TM loss curves do intersect, sometimes even multiple times. From FIG. 1B, it can be seen that there is an intersection point 8 between the TE and TM loss curves 5, 6.

There exists a relation between the minimum and maximum loss curves on the one hand and the TE and TM loss curves on the other hand. As the minimum and maximum loss curves denote the envelope of the polarization dependence of the component's loss, the loss curves corresponding to the PSPs are, like all other states of polarization, contained within the area between the minimum envelope and the maximum envelope. Since the loss curves for the two principal states of polarization (J and K) are farthest apart from each other in terms of wavelength, the minimum and maximum loss curves each coincide partly with the first one and the second one of the two PSPs.

Figure 1C:
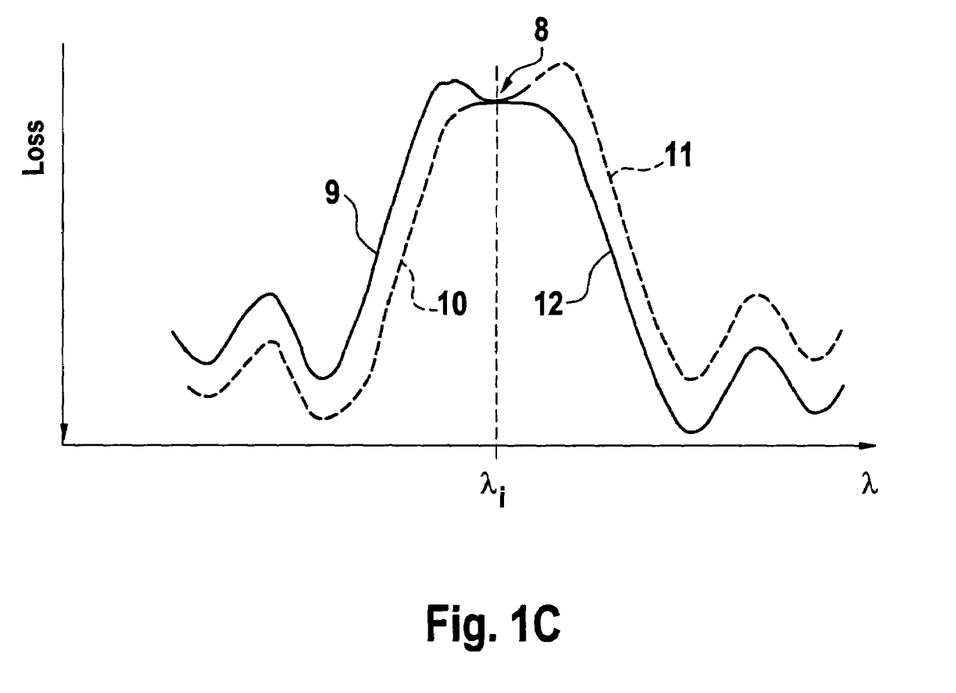

For the case of a PLC, this partial coincidence of the minimum and maximum loss curves on the one hand and the TE and TM loss curves on the other hand is shown in FIG. 1C. At the intersection point 8, the TE loss curve intersects the TM loss curve. The wavelength $\lambda_i$ denotes the wavelength at the intersection point 8. In the wavelength range below $\lambda_i$, the minimum loss curve 9 coincides with a first one of the TE and TM loss curves, and the maximum loss curve 10 coincides with a second one of said TE and TM loss curves. In the wavelength range above $\lambda_i$, the situation is different: Here, the minimum loss curve 11 coincides with said second one of the TE and TM curves, and the maximum loss curve 12 coincides with said first one of the TE and TM curves. Partial coincidence between the minimum/maximum loss curves on the one hand and the TE and TM curves on the other hand means that for each of the different wavelength ranges, a different assignment of the respective TE and TM modes to the minimum and maximum loss curves exists. The various wavelength ranges are delimited by the intersection points of the loss curves corresponding to the PSPs.

The partial coincidence of curves obtained for the J- and K-states of polarization on the one hand and the maximum and minimum curves on the other hand is not restricted to the case of loss measurements, though. For any optical property of a DUT, the spectral dependence of said optical property determined for the PSPs coincides either with the maximum or the minimum curve of said optical property. For this reason, the methods that will be described for obtaining optical property spectra for the J-state and the K-state of the incident light are not restricted to loss measurements of a DUT. They can also be applied to other optical properties such as reflectance, transmission, attenuation, group delay, sensitivity, etc.

In case the optical property to be determined is the insertion loss (IL) of the device under test, as a first step, the minimum loss curve and the maximum loss curve shown in FIG. 1A or values from which these can be determined, like average IL and PDL, have to be determined. In the following, two measurement methods for determining the maximum and minimum insertion loss as well as the polarization dependent loss (PDL) will be described.

According to the first method, a large amount of possible polarization states are generated by means of a polarization controller, and the changes of loss at the output power of the device under test are observed. For each wavelength, the minimum and the maximum loss can be determined. This method is often referred to as "polarization scrambling". For each wavelength value, the polarization controller has to set the polarization state of the incident light to a large number of different polarization states which are a mixture of linear and circular polarization with varying orientation.

The second method for determining maximum and minimum insertion loss as well as PDL is to determine the transfer matrix of the DUT. According to this method, the state of polarization of the incident light is consecutively set to a number (usually four) of different, well-known polarization states. (Note that these states are typically known at the output of the instrument that sets the polarization state but that this state is typically changed in transmission to and by the DUT as through an optical fiber where the relation between the input and output orientation is difficult to control.) For each state, the optical loss is measured at chosen wavelengths, for example by sweeping the wavelength of the light source. From these measurements, part or all of the wavelength-dependent transfer matrix of the DUT can be derived. The transfer matrix describes how polarized light interacts with the optical component. It is common practice to describe the behavior of the DUT by means of a Mueller matrix M, which is a 4×4 real matrix, and to represent both the incident and the emerging polarized light by Stokes vectors. The interaction between an incident polarized wave, characterized by the Stokes vector $S_{in}=(S0_{in}, S1_{in}, S2_{in}, S3_{in})$, with an optical component (DUT) represented by the Mueller matrix M generates an emerging light wave, which can also be characterized by a Stokes vector $S_{out}=(S0_{out}, S1_{out}, S2_{out}, S3_{out})$. The matrix equation $S_{out}=M \cdot S_{in}$ represents four linear equations, but only the first one is interesting for insertion loss (IL) and PDL calculations, because $S0_{out}$ represents the total output power. From the first row of the Mueller matrix, the following equation is obtained, whereby the Mueller matrix elements $m_{1k}$, (k=1, 2, 3, 4), represent the first row of the Mueller matrix:

$$S0_{out}=m_{11} \cdot S0_{in}+m_{12} \cdot S1_{in}+m_{13} \cdot S2_{in}+m_{14} \cdot S3_{in} \quad (1)$$

The measurements with the 4 states of polarization are used to determine the $m_{1k}$ elements. Said four different states of polarization might, for example, comprise a linear horizontal (0°) state, a linear vertical (90°) state, a linear diagonal (+45°) state, and a circular right hand state. For said four states of polarization, the optical powers $P_{a,b,c,d}(\lambda)$ input to the DUT and the optical powers $P_{1,2,3,4}(\lambda)$ emerging from the DUT are measured as a function of wavelength. All these powers can be measured with a power meter. From these measurements, the first row of the Mueller matrix comprising the matrix elements $m_{11}(\lambda)$, $m_{12}(\lambda)$, $m_{13}(\lambda)$, $m_{14}(\lambda)$ can be determined by using the algorithm based on said four different states of polarization. The algorithm below, for example, is constructed based on using a linear horizontal (0°) state, a linear vertical (90°) state, a linear diagonal (+45°) state, and a circular right hand state:

$$\begin{bmatrix} m_{11}(\lambda) \\ m_{12}(\lambda) \\ m_{13}(\lambda) \\ m_{14}(\lambda) \end{bmatrix} = \begin{bmatrix} \frac{1}{2}\left(\frac{P_1}{P_a} + \frac{P_2}{P_b}\right) \\ \frac{1}{2}\left(\frac{P_1}{P_a} - \frac{P_2}{P_b}\right) \\ \left(\frac{P_3}{P_c} - m_{11}\right) \\ \left(\frac{P_4}{P_d} - m_{11}\right) \end{bmatrix} \quad (2)$$

A vertical representation of the first row was chosen to enhance the clarity. It is possible to express the minimum and the maximum insertion loss $IL_{min}$ and $IL_{max}$ as well as the polarization dependent loss PDL of the device under test in terms of the Mueller matrix elements $m_{11}(\lambda)$, $m_{12}(\lambda)$, $m_{13}(\lambda)$, $m_{14}(\lambda)$. The search for the extrema of the transmission $$T = \frac{S0_{out}}{S0_{in}}$$

yields the minimum transmission $T_{min}$ and the maximum transmission $T_{max}$ as follows:

$$T_{min} = m_{11} - \sqrt{m_{12}^2 + m_{13}^2 + m_{14}^2},$$

$$T_{max} = m_{11} + \sqrt{m_{12}^2 + m_{13}^2 + m_{14}^2} \quad (3)$$

Once the transmission extrema are known, the minimum and maximum insertion loss $IL_{min}$ and $IL_{max}$ can be determined as $$IL_{min} = -10 \cdot \log T_{max}, \quad IL_{max} = -10 \cdot \log T_{min} \quad (4)$$

The polarization dependent loss can be written as $$PDL_{dB} = 10 \cdot \log\left(\frac{T_{max}}{T_{min}}\right) \quad (5)$$

Figure 2:
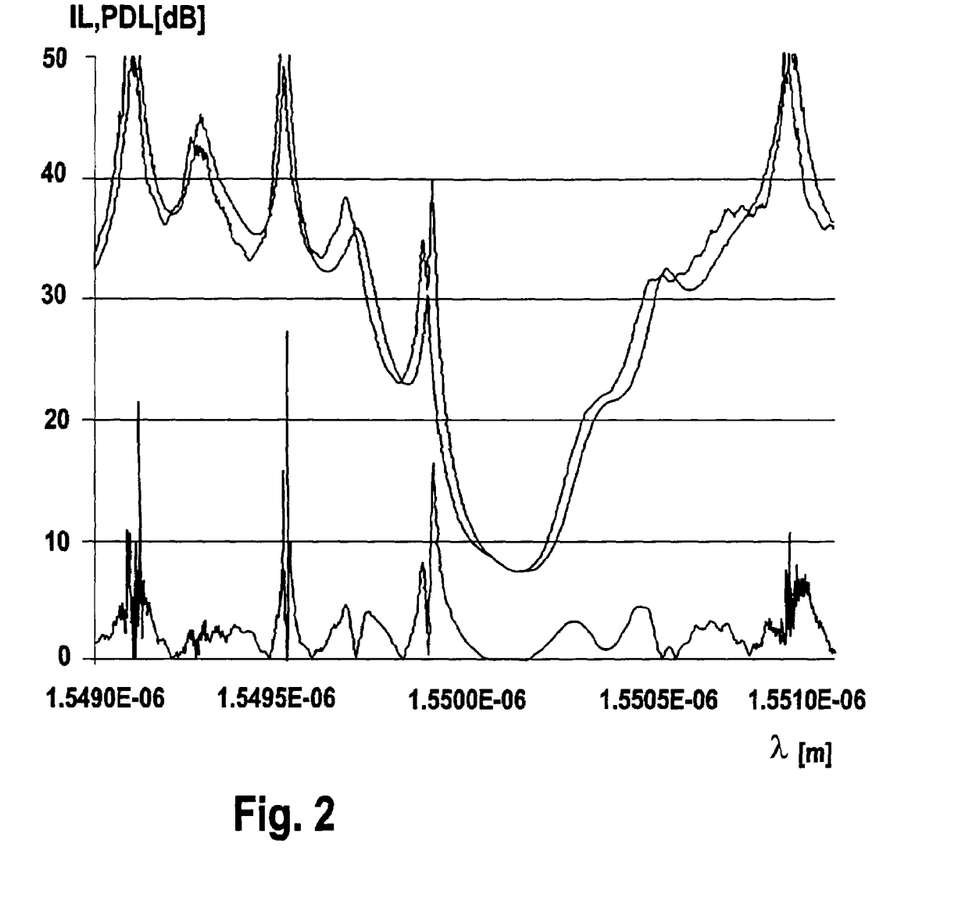
FIG. 2 depicts both the insertion loss (IL) and the polarization dependent loss (PDL) as a function of wavelength for a sample device.

FIG. 2 shows the minimum loss and the maximum loss, along with the PDL of one of the channels of a prototype AWG that shows an apparent polarization dependence. For the determination of the minimum loss, the maximum loss and the PDL spectra, the second, Mueller matrix based method described above has been used. The mode shift due to polarization effects of the AWG can be visually observed from the minimum and maximum loss curves and the associated PDL curve. Wherever the PDL is close to 0 dB, a crossing point is denoted, where the TE curve and the TM curve are supposed to intersect.

According to a first embodiment of the invention, the loss curves of the J-state and the K-state can be obtained by identifying the crossing points and by assigning curve sections of the minimum and maximum loss curves between adjacent crossing points to either the J-state curve or the K-state curve. Said crossing points are identified based on the PDL curve, whereby it is supposed that the minima of the polarization dependent loss correspond to the crossing points of the two mode curves.

Figure 3:
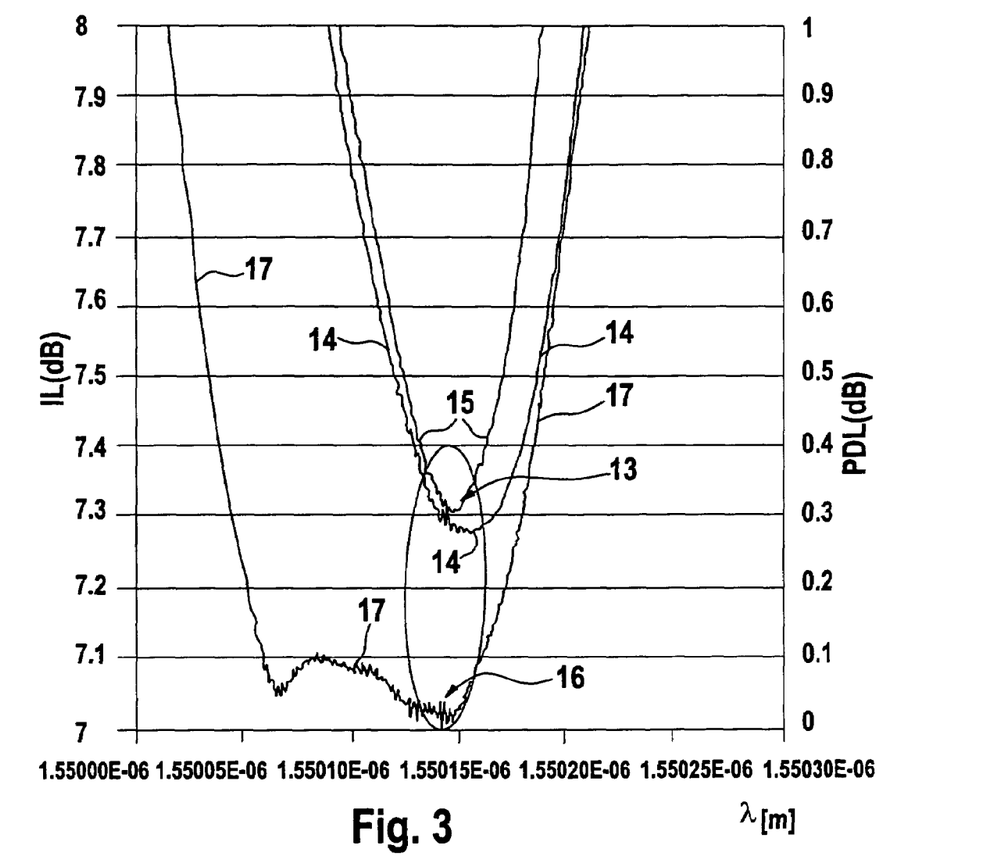
FIG. 3 shows the correspondence between an intersection of loss curves of the two principal states of polarization and a minimum of the polarization dependent loss.

In FIG. 3, the interplay between the TE/TM mode curves and the PDL curve is depicted. Both insertion loss (IL) and PDL are shown in decibels (dB) as a function of wavelength. At the point 13, the minimum loss curve 14 and the maximum loss curve 15 are tangent to each other. Therefore, point 13 is one of the desired crossing points between the TE and the TM mode curves. The polarization dependent loss is defined as the difference of the minimum and the maximum loss at a certain wavelength. Ideally, the PDL value corresponding to point 13 would be zero. However, due to physical limitation of both the test equipment and the device under test, the PDL at the crossing point is non-zero, but assumes a minimum. A limit can be defined below which the PDL value of the crossing point has to fall to indicate a crossing point. Thus, the point 13 where the TE and the TM curves intersect can be identified by means of the corresponding minimum point 16 of the PDL curve 17.

Figure 4:
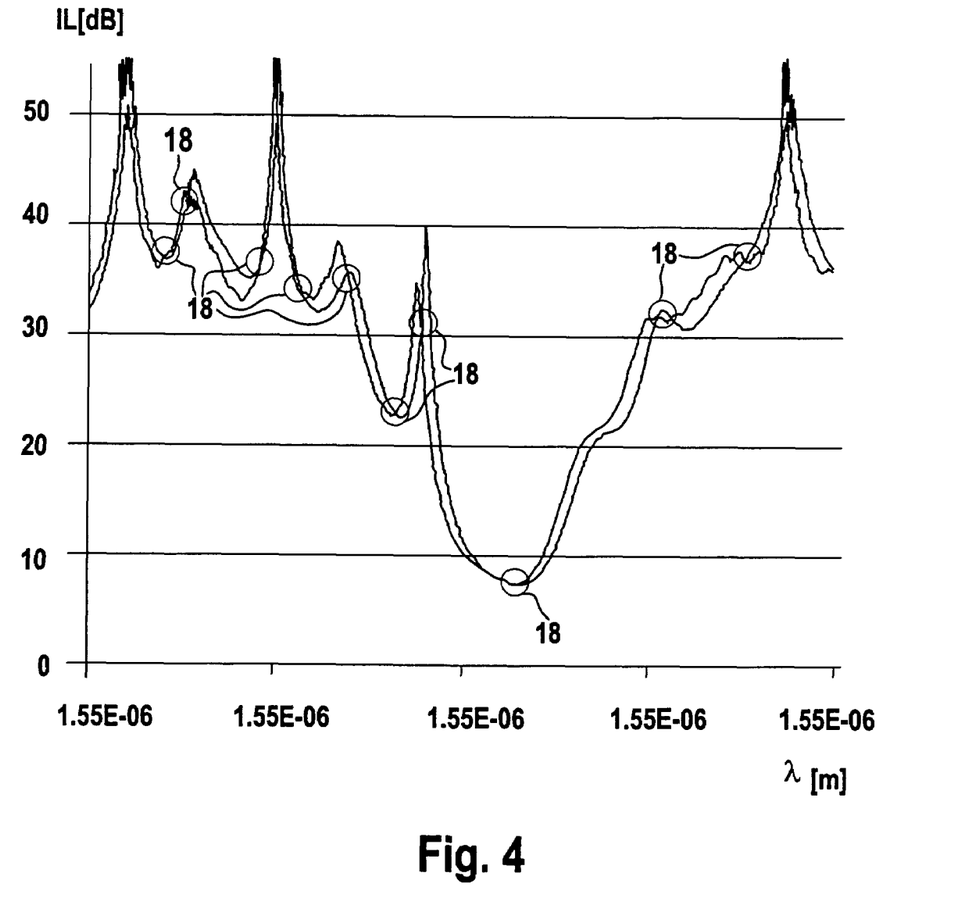
FIG. 4 shows isolated spectra for the different PSPs together with an indication of the crossing points.

In FIG. 4, the minimum and maximum loss spectra shown in FIG. 2 are shown again, together with a clear indication of the crossing points 18 obtained by analysing the PDL curve.

The following algorithm can be used for implementing the method according to the first embodiment of the invention. Starting from the maximum and minimum loss curves delivered by the Mueller method, the algorithm is capable of generating the TE and TM loss curves.

```
Find peak wavelength of average insertion loss
Analysis takes place within cross band
While within cross band
    Move to next search step
    If current λ is within band limit of loss peak
        Find one minimum PDL within band limit
    Else
        Find one minimum PDL within search step
    end if
    If minimum PDL is within PDL limit
        Swap minimum and maximum loss curves from
            minimum PDL λ
    end if
end while
```

Figure 5:
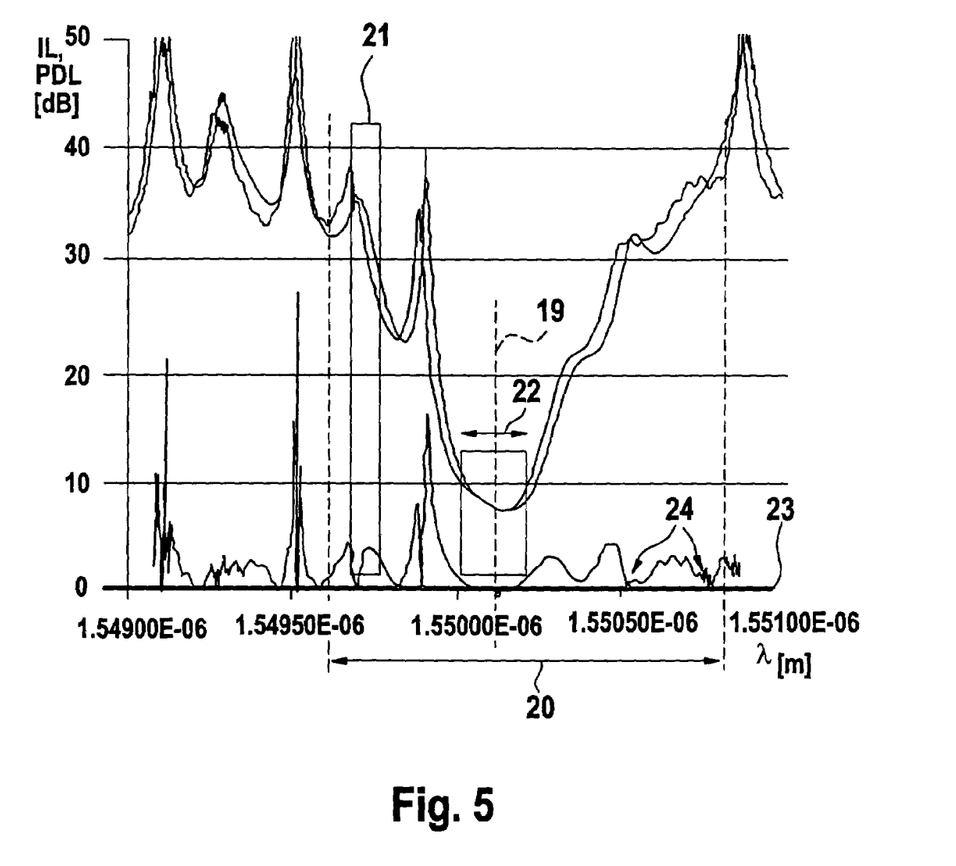
FIG. 5 illustrates how the algorithm for finding the loss curves' crossing points works.

In FIG. 5, the parameters used within the algorithm are indicated: the peak wavelength 19, the cross band 20, the search step 21, the band limit 22 and the PDL limit 23. Furthermore, the crossing points 24 are indicated.

In the first step, "find peak wavelength of average insertion loss", the peak wavelength 19 of the loss curves is identified. In case the loss curves correspond to an optical filter, the peak wavelength 19 is the wavelength where the filter's transmission reaches its maximum. The cross band 20 is the wavelength range of interest, in which TE and TM modes are extracted from the minimum and maximum curves. The cross band 20 can be defined by the user in order to exclude the high isolation parts of the filter where noise is dominating. By means of a while loop which extends from the instruction "while within cross band" to "end while", it can be achieved that the algorithm is only applied within the cross band 20.

In the wavelength range defined by cross band 20, the extraction of TE and TM curves from the minimum and maximum loss spectra continues in smaller defined wavelength bands, whereby the width of said smaller wavelength bands is defined by the search step 21 shown in FIG. 5. With the instruction "move to next search step", it is possible to proceed to the adjacent search step. Search step divides the cross band 20 in smaller sections in order to have at most one crossing point 24 of TE and TM curves within each search window defined by the search step 21. The width of search step 21 should be defined accordingly. Within each search step, the minimum of the PDL curve is identified as a possible candidate for a crossing point.

Identifying the crossing points of the TE and TM curves with a rather small search window works well outside of the filter's pass band. However, the PDL of an AWG tends to be low around the peak wavelength. Within the pass band, many points of the PDL curve fall below the PDL limit 23. With each search step, there would be a minimum PDL value found which might not coincide with a crossing point. Unwanted spectrum exchange might occur without limitation around the centre wavelength. This is then expressed in a sort of zig-zag in the TE and TM curves.

For this reason, a broader wavelength range covering the pass band or low PDL range must be introduced, with the PDL minimum being searched within said broader wavelength range. This wavelength range is the band limit 22 shown in FIG. 5. The band limit 22 has to be larger than the search step 21. The band limit 22 might for example be centred around the peak wavelength 19, ITU or any user defined wavelength. Alternatively, it is possible to define the band limit 22 as the wavelength range within for example 0.5 dB (or any other dB value) above the minimum loss measured at the peak wavelength 19. Within the band limit 22, the number of crossing points is limited to one crossing point. The algorithm basically comprises two steps: first, outside of the band limit 22, a scan with the search step 21 is performed in order to find the PDL minima. Then, within the low PDL area of the band limit 22, a search for the PDL minimum is performed. This search strategy is implemented by means of an if-instruction:

```
If current λ is within band limit of loss peak
    Find one minimum PDL within band limit
Else
    Find one minimum PDL within search step
end if
```

Next, it is checked whether the minimum PDL value found within search step 21 or within band limit 22 is a crossing point. For this purpose, the minimum PDL value is compared with a user defined PDL limit 23, and if said minimum PDL value is below said PDL limit 23, it is assumed that it corresponds to a crossing point 24 of the TE and the TM curves. If the minimum PDL value is identified as a crossing point, the minimum and maximum insertion loss spectra are exchanged, starting from the wavelength of said minimum PDL value. The identification of crossing points and the exchange of minimum and maximum insertion loss spectra are implemented by means of the following if-clause:

```
If minimum PDL is within PDL limit
    Swap minimum and maximum loss curves from minimum PDL λ
end if
```

The spectrum swap is performed for the rest of the trailing loss spectrum, starting from the identified crossing point. For each of the identified crossing points, a separate exchange of loss spectra is performed. The process of identifying crossing points and of exchanging the trailing loss spectra continues within the while loop until the whole wavelength range defined by the cross band 20 is searched completely.

In the following, a second embodiment of the invention will be described. In this embodiment, the insertion loss spectra for the PSPs are obtained from a calculation based on the transfer matrix of the DUT, in particular on the Mueller matrix. As a first step, the top row of the Mueller matrix is determined. As described above, the Mueller matrix elements $m_{11}(\lambda)$, $m_{12}(\lambda)$, $m_{13}(\lambda)$, $m_{14}(\lambda)$ are determined by performing spectral measurements for said four different states of polarization, whereby four arrays of reference data ($P_a$, $P_b$, $P_c$, $P_d$) and four arrays of PUT data ($P_1$, $P_2$, $P_3$, $P_4$) at desired wavelengths are obtained. Based on these eight arrays of data, the Mueller matrix elements can be obtained by inserting $P_a$, $P_b$, $P_c$, $P_d$ and $P_1$, $P_2$, $P_3$, $P_4$ into the above formula (2). From the Mueller matrix elements, the minimum transmission $T_{min}$ and the maximum transmission $T_{max}$ can be obtained by means of formula (3) as given above, and from $T_{min}$ and $T_{max}$, the minimum and maximum insertion loss $IL_{min}$ and $IL_{max}$ can be derived by means of the above formula (4). $T_{max}$, $T_{min}$, $IL_{max}$, $IL_{min}$ denote arrays of transmission or loss data over wavelength.

The second embodiment of the invention is not limited to the determination of transmission or loss properties of the DUT. Any optical property of the DUT that can be expressed as a function of such Mueller matrix elements $m_{11}(\lambda)$, $m_{12}(\lambda)$, $m_{13}(\lambda)$, $m_{14}(\lambda)$, such as absorption, reflectance, etc., can be determined.

In order to derive the insertion loss curves for the PSPs, at least one spectral point of reference is required which is used as a starting point for the calculation of the two mode curves. There are two requirements that have to be fulfilled by said point of reference. In order to be able to clearly distinguish between the different mode curves, the polarization dependent loss at said point of reference has to be sufficiently high. A second requirement is that at the wavelength corresponding to the point of reference, the signal strength of the DUT signal is sufficiently high. Therefore, the insertion loss value at said point of reference is preferably sufficiently low, for example within 3 dB from the insertion loss minimum. Since the insertion loss is an array of power over wavelength, it is possible to identify an $n^{th}$ array element with a wavelength $\lambda_n$ at said point of reference.

In a next step, the Stokes vectors of the J- and K-states of polarization are determined. One of the two Stokes vectors $X_J$ and $X_K$ corresponds to the insertion loss maximum at the wavelength $\lambda_n$, and the other Stokes vector corresponds to the insertion loss minimum at the wavelength $\lambda_n$. The following equations show how the two Stokes vectors $X_J$ and $X_K$ corresponding to the two PSPs can be expressed in terms of the matrix elements $m_{11}(\lambda_n)$, $m_{12}(\lambda_n)$, $m_{13}(\lambda_n)$, $m_{14}(\lambda_n)$ at the fixed wavelength $\lambda_n$. For the case of planar devices, the two Stokes vectors $X_J$ and $X_K$ correspond to the TE and TM mode.

$$x1_J = \frac{S1_{in}}{S0_{in}} = +\left(\frac{m_{11}(\lambda_n)}{\sqrt{m_{12}(\lambda_n)^2 + m_{13}(\lambda_n)^2 + m_{14}(\lambda_n)^2}}\right) \quad (6)$$

$$x2_J = \frac{S2_{in}}{S0_{in}} = +\left(\frac{m_{12}(\lambda_n)}{\sqrt{m_{12}(\lambda_n)^2 + m_{13}(\lambda_n)^2 + m_{14}(\lambda_n)^2}}\right)$$

$$x3_J = \frac{S3_{in}}{S0_{in}} = +\left(\frac{m_{13}(\lambda_n)}{\sqrt{m_{12}(\lambda_n)^2 + m_{13}(\lambda_n)^2 + m_{14}(\lambda_n)^2}}\right)$$

$$x1_K = \frac{S1_{in}}{S0_{in}} = +\left(\frac{m_{11}(\lambda_n)}{\sqrt{m_{12}(\lambda_n)^2 + m_{13}(\lambda_n)^2 + m_{14}(\lambda_n)^2}}\right) \quad (7)$$

$$x2_K = \frac{S2_{in}}{S0_{in}} = +\left(\frac{m_{12}(\lambda_n)}{\sqrt{m_{12}(\lambda_n)^2 + m_{13}(\lambda_n)^2 + m_{14}(\lambda_n)^2}}\right)$$

$$x3_K = \frac{S3_{in}}{S0_{in}} = +\left(\frac{m_{13}(\lambda_n)}{\sqrt{m_{12}(\lambda_n)^2 + m_{13}(\lambda_n)^2 + m_{14}(\lambda_n)^2}}\right)$$

Details of how the above formula are derived can be found in the appendix "A1. PDL Calculation" of the above-mentioned product note "PDL Measurements using the Agilent 8169A Polarization Controller".

In the next step, both the J- and the K-state insertion loss spectra are determined over a range of wavelengths using the Stokes vectors $X_J$ and $X_K$ determined at the wavelength $\lambda_n$. The relationship between the Stokes vector $S_{in}$ at the input of the device under test and the Stokes vector $S_{out}$ at the output of said device can be expressed by the matrix equation $S_{out} = M \cdot S_{in}$. The first component $S0_{out}$ of said matrix equation can be written as follows:

$$S0_{out} = m_{11}(\lambda) \cdot S0_{in} + m_{12}(\lambda) \cdot S1_{in} + m_{13}(\lambda) \cdot S2_{in} + m_{14}(\lambda) \cdot S3_{in} \quad (8)$$

The transmission of the device under test can be obtained by relating the power at the output, $S0_{out}$, to the power at the device's input, $S0_{in}$. With the above expression for $S0_{out}$, the transmission T can be written as $$T = \frac{m_{11}(\lambda) \cdot S0_{in} + m_{12}(\lambda) \cdot S1_{in} + m_{13}(\lambda) \cdot S2_{in} + m_{14}(\lambda) \cdot S3_{in}}{S0_{in}} \quad (9)$$

With $$x1 = \frac{S1_{in}}{S0_{in}}, x2 = \frac{S2_{in}}{S0_{in}}, x3 = \frac{S3_{in}}{S0_{in}},$$

the transmission $T_J$, $T_K$ for the two principal states of polarization J, K in dependence on the wavelength $\lambda$ can be written as:

$$T_J(\lambda) = m_{11}(\lambda) + m_{12}(\lambda) \cdot x1_J + m_{13}(\lambda) \cdot x2_J + m_{14}(\lambda) \cdot x3_J$$

$$T_K(\lambda) = m_{11}(\lambda) + m_{12}(\lambda) \cdot x1_K + m_{13}(\lambda) \cdot x2_K + m_{14}(\lambda) \cdot x3_K \quad (10)$$

As described above, the states of polarization $x1_J$, $x2_J$, $x3_J$ and $x1_K$, $x2_K$, $x3_K$ have been determined at the wavelength $\lambda_n$, which is not necessarily equal to the wavelength $\lambda$ at which $T_J$, $T_K$ have to be determined. Here, the approximation has been made that $x1_J$, $x2_J$, $x3_J$ and $x1_K$, $x2_K$, $x3_K$ are constant within a wavelength range around $\lambda_n$. In case there is only one point of reference for the wavelength range of interest, it is even assumed that $x1_J$, $x2_J$, $x3_J$ and $x1_K$, $x2_K$, $x3_K$ are constant within the whole wavelength range of interest. The assumption that the Stokes vectors $X_J$, $X_K$ corresponding to the principal states of polarization J, K do not strongly depend on wavelength is a rather good approximation, because it can be shown that there is usually only a second order dependence of the Stokes parameters $X_J$, $X_K$ on the wavelength $\lambda$. This second order dependence is usually characterized as "second order polarization mode dispersion (PMD)". When the above assumption is made, the wavelength dependence of the loss curves for the J- and the K-state is generated by the wavelength dependence of the matrix elements $m_{11}(\lambda_n)$, $m_{12}(\lambda_n)$, $m_{13}(\lambda_n)$, $m_{14}(\lambda_n)$, whereby $x1_J$, $x2_J$, $x3_J$ and $x1_K$, $x2_K$, $x3_K$ are considered as constants.

It is also possible to track the spectral dependence of the polarization parameters for the PSPs caused by second order PMD. In this case, the polarization parameters for the PSPs have to be determined for a multitude of points of reference. The wavelengths where said PSPs are determined have to be close enough together that the change in PSP is small enough so that the two PSP at one wavelength can be clearly related to the respective PSPs of the next wavelength.

Figure 6:
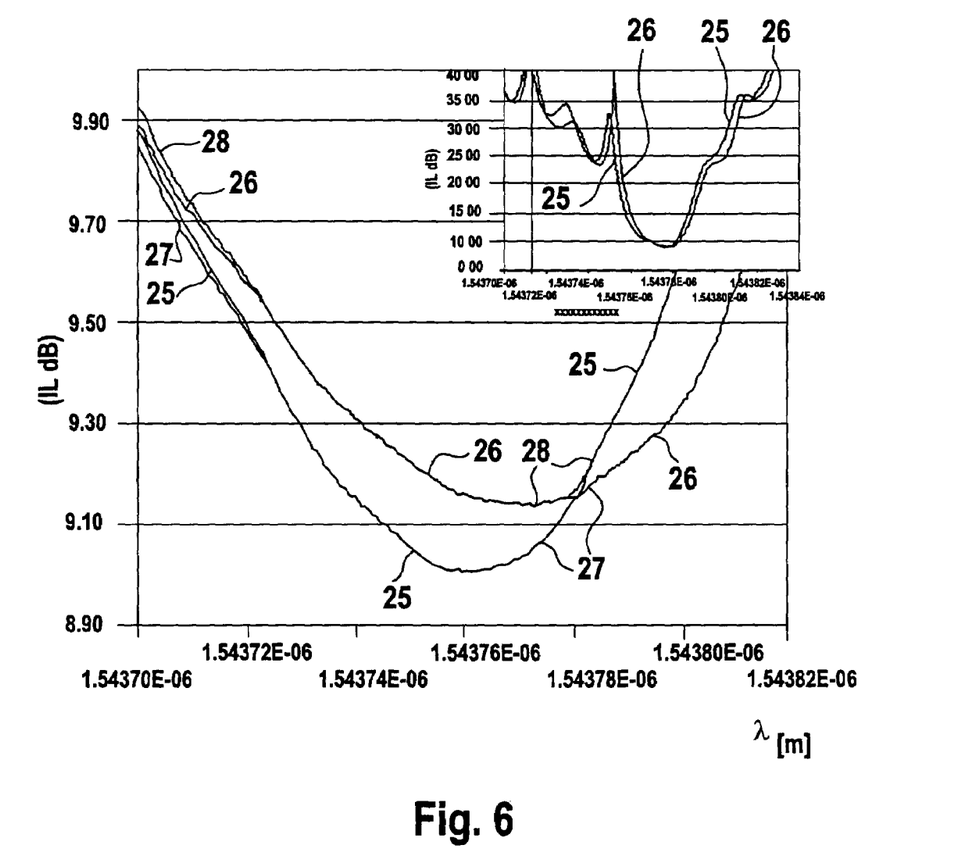
FIG. 6 shows the calculated TE and TM mode curves together with the minimum and the maximum loss curves.

In FIG. 6, the calculated TE mode curve 25 and the calculated TM mode curve 26 are shown as a function of wavelength, together with the minimum loss curve 27 and the maximum loss curve 28. The TE and TM mode curves 25, 26 have been obtained by determining the Mueller matrix elements, by calculating $T_J(\lambda)$ and $T_K(\lambda)$ according to the above formula (10), and by deriving the insertion loss in decibels from said properties. The minimum and maximum loss spectra 27, 28 have been obtained by a calculation based on the Mueller matrix elements that has also been described above.

The measurement instrument settings necessary to obtain the PSPs at the DUT's input are often not known, especially because the DUT may have an optical fiber input connection which can modify the polarization state between the instrument and the PLC in an unknown way. According to the second embodiment of the invention, the Mueller matrix elements of the DUT have been determined for different settings of a polarization controller that precedes the DUT. Starting from the J- and K-state $X_J$, $X_K$ calculated according to the above formulas (6) and (7), it is possible to derive the instrument settings of the polarization controller in a way that the two PSPs are obtained at the DUT's input. For these two instrument settings, two additional insertion loss measurements may be recorded, in order to find out whether the insertion loss spectra for the PSPs calculated according to formula (10) coincide with actual measurement results.

For performing the confirmation measurements, two sets of instrument settings have to be calculated. In case an Agilent 8169A polarization controller or a polarization controller of a corresponding type is used, the parameters $\alpha_Q$, $\alpha_H$ and $2\theta$ have to be determined for both the J- and the K-state. Here, $\alpha_Q$ and $\alpha_H$ denote the respective angles of the controller's half wave plate and quarter wave plate, and $2\theta$ denotes the angular displacement of a polarization state in the plane of linear polarization ($\theta$-plane) of the Poincaré sphere. More details concerning the determination of $\alpha_Q$, $\alpha_H$ and $2\theta$ can be found in the appendix "A2. Calculation and Setting of Min/Max Polarization States on the 8169A" of the above-mentioned product note "PDL Measurements using the Agilent 8169A Polarization Controller".

This above-described method can also be used to obtain the PSP mode spectra of other optical properties, like for example group delay, after using the analysis of the Mueller matrix to set the instrumentation.

Figure 7:
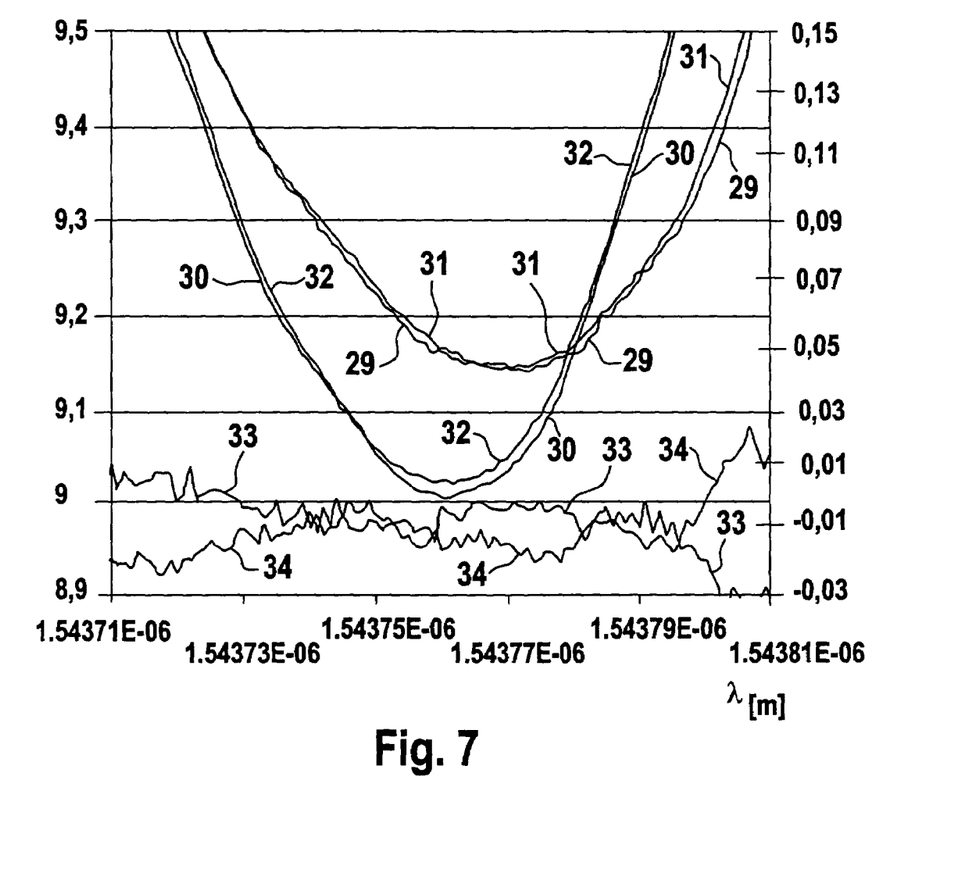
FIG. 7 shows the calculated and the measured PSP loss curves, together with the PSP-curve calculation error.

In FIG. 7, the calculated J- and K-state loss curves 29, 30 and the measured J- and K-state loss curves 31, 32 are shown together with the J-state calculation error 33 and the K-state calculation error 34. The system uncertainty due to external conditions, such as environmental changes and connection/disconnection of the cable, is typically about 10 mdB or above and depends on how good the fiber is maintained. Considering the above factors, the calculation error is minimum.

So far, two embodiments of the invention have been introduced for deriving the insertion loss curves for the principal states of polarization. In case of planar devices, the TE and TM mode curves are obtained. In the following, it will be described how the polarization dependent wavelength shift can be determined when said two mode curves are given.

Figure 8:
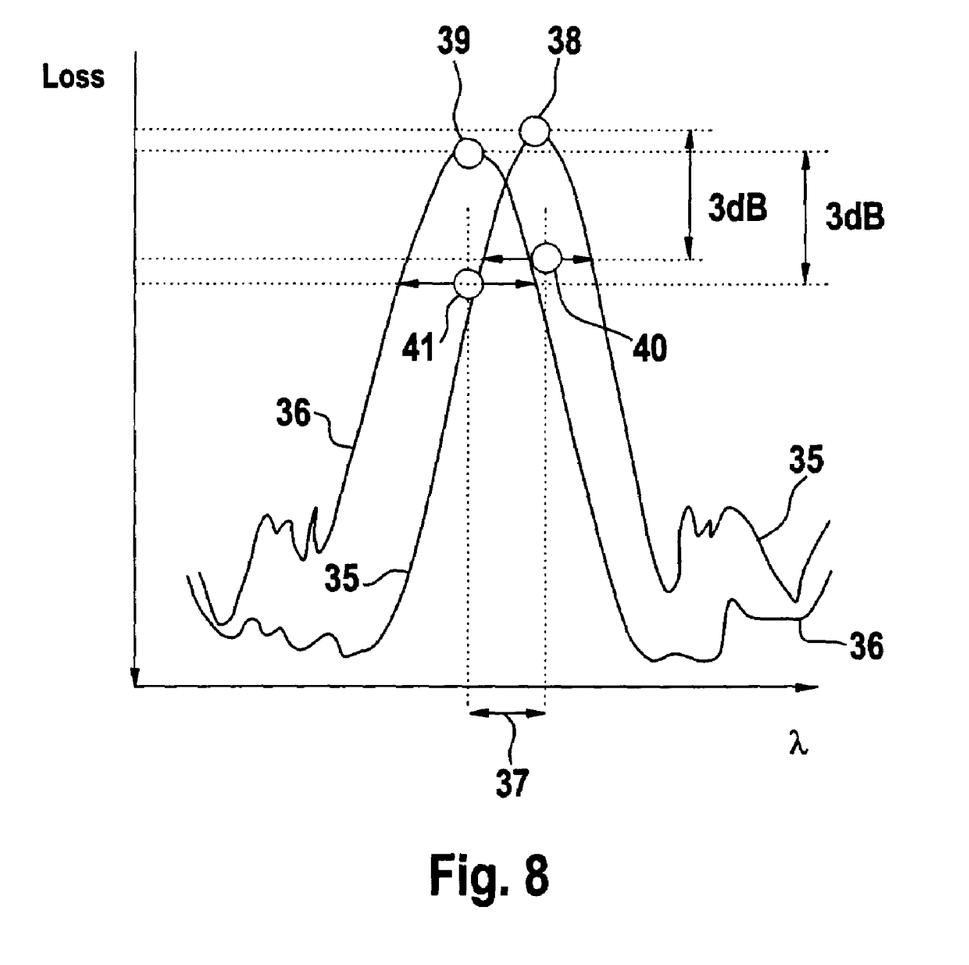
FIG. 8 shows how the polarization dependent wavelength shift can be obtained from the spectra obtained for the different PSPs.

In FIG. 8, the TE curve 35 and the TM curve 36 are shown as a function of wavelength. A first possibility for calculating the polarization dependent wavelength shift 37 is to determine the transmission maxima 38, 39 of the TE and TM curves 35, 36, and to subtract the wavelengths corresponding to said two points. Another possibility is to determine four wavelength points at n dB (in FIG. 8, 3 dB) down from the transmission peaks of the TE and TM curves 35, 36. From said four points, the centre wavelengths 40, 41 of the TE and TM curves 35, 36 can be derived. Again, the polarization dependent wavelength shift 37 is obtained by calculating the difference of the centre wavelengths 40, 41 of both spectra. Similarly, the wavelength shift in any other wavelength parameter defined to characterize the device can be determined.

What is claimed is:

1. A method for determining mode spectra of an optical property of a device under test—DUT—in dependence on a spectral parameter, with said mode spectra corresponding to the device's principal states of polarization—PSPs—,the method comprising:
    determining minimum envelope values and maximum envelope values of said optical property, or other measured values from which said envelope values can be determined with respect to possible state of polarization of light that is incident upon said DUT, whereby said minimum envelope values and said maximum envelope values are determined for a spectral range of interest of said spectral parameter;
    deriving the mode spectra of said optical property for at least one of the PSPs as a function of said spectral parameter for said spectral range of interest, whereby a partial correspondence of said mode spectra with said minimum and maximum envelope values is used for deriving said mode spectra.

2. The method according to claim 1, wherein said spectral parameter is either the wavelength or the frequency of the light incident upon said DUT.

3. The method according to claim 2, wherein, from said mode spectra, and in particular from the peaks of said mode spectra, a polarization dependent wavelength shift of the DUT is determined.

4. The method according to claim 1, wherein said DUT is a planar lightwave circuit, such as an arrayed waveguide grating or a semiconductor optical amplifier, and wherein said mode spectra are the TE and TM mode spectra of said planar lightwave circuit.

5. The method according to claim 1, comprising analysing where the difference between the maximum envelope and the minimum envelope is smaller than a predefined threshold, in order to identify crossing points where said mode spectra cross each other.

6. The method according to claim 5, wherein said crossing points are determined by means of a search window that is swept over said spectral range of interest, said search window having a well-defined spectral width, whereby, within said search window, a point of closest approach between the minimum envelope and the maximum envelope is determined.

7. The method according to claim 6, wherein the difference between the minimum envelope and the maximum envelope at the point of closest approach within the search window is compared with a predefined threshold, whereby in case said difference is below the predefined threshold, said point of closest approach is identified as a crossing point.

8. The method according to claim 6, wherein a spectral band is defined around the peaks of the minimum envelope or the maximum envelope, whereby the width of said spectral band exceeds the spectral width of the search window, and whereby at most one crossing point is identified within said spectral band.

9. The method according to claim 5, wherein said range of interest is divided by said crossing points into a set of subsections, with said subsections being delimited by said crossing points.

10. The method according to claim 9, wherein said mode spectra are constructed by assigning, for each of said subsections, the respective segments of the maximum envelope and of the minimum envelope to either one of said mode spectra for the PSPs, whereby within a first of two adjacent subsections, the maximum envelope is assigned to a first mode spectrum and the minimum envelope to a second mode spectrum, and within an adjacent subsection, the maximum envelope is assigned to said second mode spectrum and the minimum envelope to said first mode spectrum.

11. The method according to claim 5, further comprising:
    initially assigning the maximum envelope to a first mode spectrum and the minimum envelope to a second mode spectrum;
    identifying crossing points in ascending or descending order of said spectral parameter, and, for a range of said spectral parameter starting at a respective crossing point, interchanging the assignment of the tailings of said maximum and minimum envelopes to said first mode spectrum and said second mode spectrum.

12. The method according to claim 1, comprising:
    determining at least part of a transfer matrix of the DUT, such as the Mueller matrix of the DUT, as a function of said spectral parameter;
    determining, at one or more points of reference, polarization parameters for at least one of said PSPs;
    deriving the mode spectra of said optical property in dependence on said spectral parameter from the polarization parameters at said one or more points of reference and the matrix elements of the transfer matrix, whereby said polarization parameters are assumed to be constant over spectral ranges around said points of reference, and whereby the spectral variation of said mode spectra is generated by the dependence of said matrix elements on said spectral parameter.

13. The method according to claim 12, wherein said one or more points of reference are chosen such that at said points of reference, the minimum envelope and the maximum envelope of said optical property are sufficiently far apart to be clearly distinguishable, and that the value of the measured signal is large compared to the measurement error.

14. The method according to claim 12, wherein said optical property is any optical property of the DUT that can be expressed in terms of the polarization parameters for the PSPs and the matrix elements of the transfer matrix, such as transmission, insertion loss, reflectance, etc.

15. The method according to claim 12, wherein the spectral evolution of the PSPs is tracked by determining, for a multitude of points of reference, polarization parameters for at least one of the PSPs, whereby the spacing of the points of reference is chosen in a way that the change of the polarization parameters is small enough that the PSPs at a first point of reference can be clearly related to the PSPs at a neighboring point of reference.

16. A software program or product, embodied on a computer readable medium, for executing the method of claim 1 when run on a data processing system.

17. An apparatus for determining mode spectra of an optical property of a device under test—DUT—in dependence on a spectral parameter, with said mode spectra corresponding to the device's principal states of polarization—PSPs—, said apparatus comprising:
    a minimum/maximum unit adapted for determining minimum envelope values and maximum envelope values of said optical property, or other measured values from which said envelope values can be determined with respect to possible states of polarization of light that is incident upon said DUT, whereby said minimum envelope values and said maximum envelope values are determined for a spectral range of interest of said spectral parameter;

a mode spectra generation unit adapted for deriving the mode spectra of said optical property for at least one of the PSPs of said incident light as a function of said spectral parameter, which uses a partial correspondence of said mode spectra with said minimum and maximum envelope values for deriving said mode spectra.

18. The apparatus according to claim 17, wherein said minimum/maximum unit determines at least part of a transfer matrix of the DUT, such as the Mueller matrix of the DUT, as a function of said spectral parameter, whereby said minimum envelope values and said maximum envelope values are derived from said transfer matrix.

19. The apparatus according to claim 17, wherein said minimum/maximum unit determines said minimum envelope values and said maximum envelope values of said optical property by varying the polarization of the incident light over various different states of polarization.

20. The apparatus according to claim 17, wherein said mode spectra generation unit analyses where the difference between the maximum envelope and the minimum envelope is smaller than a predefined threshold, in order to identify crossing points where said mode spectra cross each other.

21. The apparatus according to claim 20, wherein said mode spectra generation unit divides said range of interest into a set of subsections, whereby said subsections are delimited by said crossing points.

22. The apparatus according to claim 21, wherein said mode spectra generation unit assigns, for each of said subsections, the respective segment of the maximum envelope and of the minimum envelope to either one of said mode spectra for the PSPs, whereby within a first subsection, the maximum envelope is assigned to a first mode spectrum and the minimum envelope to a second mode spectrum, and within an adjacent subsection, the maximum envelope is assigned to said second mode spectrum and the minimum envelope to said first mode spectrum.

23. The apparatus according to claim 20, wherein said mode spectra generation unit initially assigns the maximum envelope to a first mode spectrum and the minimum envelope to a second mode spectrum, identifies crossing points in ascending or descending order of said spectral parameter, and interchanges the assignment of the tailings of said maximum and minimum envelopes to said first mode spectrum and said second mode spectrum for a range of said spectral parameter starting at a respective crossing point.

24. The apparatus according to claim 17, wherein said apparatus determines at least part of a transfer matrix of the DUT, such as the Mueller matrix of the DUT, as a function of said spectral parameter, determines, at one or more points of reference, polarization parameters for at least one of said PSPs, and derives the mode spectra of said optical property in dependence on said spectral parameter from the polarization parameters at said one or more points of reference and the matrix elements of the transfer matrix, whereby said polarization parameters are assumed to be constant over spectral ranges around said points of reference, and whereby the spectral variation of said mode spectra is generated by the dependence of said matrix elements on said spectral parameter.

25. The apparatus according to claim 24, wherein said mode spectra generation unit chooses said one or more points of reference such that at said points of reference, the minimum envelope and the maximum envelope of said optical property are sufficiently far apart to be clearly distinguishable, and that the value of said optical property is large compared to the measurement error.

26. The apparatus according to claim 17, wherein said apparatus determines at least part of a transfer matrix of the DUT, such as the Mueller matrix of the DUT, as a function of said spectral parameter, determines, at one or more points of reference, polarization parameters for at least one of said PSPs, and sets the polarization state of the light from a polarization controller to the DUT according to said polarization parameters and at least part of said transfer matrix, and measures the optical property for at least one of said PSPs over a range of the spectral parameter around the respective point of reference.

* * * * *